(12) United States Patent
Moore et al.

(10) Patent No.: US 11,849,667 B2
(45) Date of Patent: Dec. 26, 2023

(54) MAGNETIC PANEL FOR UTILITY VEHICLE

(71) Applicant: EXMARK MANUFACTURING COMPANY INCORPORATED, Beatrice, NE (US)

(72) Inventors: Jeffrey J. Moore, Beatrice, NE (US); Kyler J. Macy, Minneapolis, KS (US); Michael S. Fredenburg, Hickman, NE (US); Derek L. Dragoo, Clatonia, NE (US); Jonathan S. Guarneri, Lincoln, NE (US)

(73) Assignee: EXMARK MANUFACTURING COMPANY INCORPORATED, Beatrice, NE (US)

( * ) Notice: Subject to any disclaimer, the term of this patent is extended or adjusted under 35 U.S.C. 154(b) by 0 days.

(21) Appl. No.: 17/984,822

(22) Filed: Nov. 10, 2022

(65) Prior Publication Data

US 2023/0210047 A1  Jul. 6, 2023

Related U.S. Application Data

(60) Provisional application No. 63/295,305, filed on Dec. 30, 2021.

(51) Int. Cl.
*A01D 34/00* (2006.01)
*A01D 101/00* (2006.01)

(52) U.S. Cl.
CPC ........ *A01D 34/001* (2013.01); *A01D 2101/00* (2013.01)

(58) Field of Classification Search
CPC ............................ A01D 34/001; A01D 2101/00
See application file for complete search history.

(56) References Cited

U.S. PATENT DOCUMENTS

| | | | |
|---|---|---|---|
| 2,932,545 A | 4/1960 | Foley | |
| 3,468,576 A | 9/1969 | Beyer et al. | |
| 7,843,296 B2 | 11/2010 | Fullerton et al. | |
| 9,954,571 B2 | 4/2018 | Sartee et al. | |
| 10,694,631 B2 | 6/2020 | Bomer | |
| 2012/0000173 A1* | 1/2012 | Papke | A01D 34/82 56/14.7 |

(Continued)

FOREIGN PATENT DOCUMENTS

CN    112082252 A    12/2020

OTHER PUBLICATIONS

U.S. Appl. No. 63/295,305 (priority application), filed Dec. 30, 2021.

*Primary Examiner* — Tony H Winner
(74) *Attorney, Agent, or Firm* — Mueting Raasch Group

(57) ABSTRACT

A utility vehicle having a magnetic panel movably and removably coupled thereto. The vehicle includes a frame carrying a prime mover and ground engaging members operatively attached to the frame. The vehicle also include includes a panel extending between a first end region and a second end region. The first end region of the panel is operatively coupled to the frame such that panel is both movably and removably attached to the frame. One or more magnets are positioned between the portion of the frame and an inner surface of the panel proximate the second end region of the panel such that the second end region of the panel is adapted to be removably couplable to the control tower via the one or more magnets.

29 Claims, 8 Drawing Sheets

(56) References Cited

U.S. PATENT DOCUMENTS

| | | |
|---|---|---|
| 2014/0265781 A1 | 9/2014 | Rader et al. |
| 2018/0184591 A1* | 7/2018 | Song ..................... A01D 34/008 |
| 2021/0096574 A1* | 4/2021 | Lee ......................... B60L 53/16 |
| 2021/0307251 A1 | 10/2021 | Fisher et al. |

* cited by examiner

MAGNETIC PANEL FOR UTILITY VEHICLE

The present application claims priority to and/or the benefit of U.S. Provisional Patent Application No. 63/295,305, filed Dec. 30, 2021, which is incorporated herein by reference in its entirety.

Embodiments of the present disclosure relate to utility vehicles such as, e.g., compact utility loaders, mowers, ground treatment vehicles, sprayer spreaders, etc. having a magnetic access panel.

BACKGROUND

Utility vehicles (e.g., compact utility loaders) are known for performing various types of work in an outdoor or indoor environment. While able to perform the types of work often associated with large skid steer loaders, compact utility loaders are generally smaller in size. Furthermore, some utility vehicles may be controlled by a stand-on operator and, therefore, do not carry an operator in a seated position. Instead, they are most often operated by an operator who stands on a platform attached to the rear of the vehicle. It is noted that, as it pertains to the present disclosure, stand-on utility vehicles may also include stand-on lawn mowers, stand-on ground treatment vehicles, stand-on sprayer spreaders, etc.

Specifically, the stand-on utility vehicles may include a control tower located at or near a rear end of the utility vehicle. The control tower may carry controls (e.g., a control console) adapted to be manipulated by an operator standing on the platform mounted near the rear end of the frame (e.g., the platform is rearward of the control tower). As such, the operator may lean forward towards the control tower. In many stand-on utility vehicles, the control tower may include a cushion or pad on the rear side of the control tower for the operator to lean against (e.g., contacting the cushion or pad with the legs of the operator). Further, the cushion or pad may act as a dampener (e.g., from vibrations and jolting) and a comfortable rest for the legs of the operator. Often the cushions or pads found on typical utility vehicles are not removable or require a tool to be removed.

SUMMARY

Embodiments of the present disclosure may provide a utility vehicle that includes a frame carrying a prime mover and ground engaging members operatively attached to the frame. At least one of the ground engaging members may be powered by the prime mover to propel the frame over a ground surface. The utility vehicle may also include a panel extending between a first end region and a second end region. The first end region of the panel may be operatively coupled to the frame such that panel is both movably and removably attached to the frame. The panel may define an outer surface, and an inner surface adapted to face a portion of the frame when the panel is coupled to the frame. The utility vehicle may also include one or more magnets positioned between the portion of the frame and the inner surface of the panel proximate the second end region of the panel such that the second end region of the panel may be adapted to be removably couplable to the frame via the one or more magnets.

In another embodiment, a stand-on utility vehicle is provided that includes a frame carrying a prime mover and ground engaging members operatively attached to the frame. At least one of the ground engaging members may be powered by the prime mover to propel the frame over a ground surface. The vehicle may also include a control tower, a panel, a leg pad, and one or more magnets. The control tower may be located at or near a rear end of the frame. The control tower may carry controls adapted to be manipulated by an operator standing on a platform mounted near the rear end of the frame. The panel may be movably coupled to the control tower. The panel may define an outer surface, and an inner surface adapted to face a rearward surface of the control console when the panel is coupled to the control tower. The leg pad may be coupled to the outer surface of the panel. The leg pad may be adapted to contact a leg of the operator standing on the platform. The one or more magnets may be positioned between the rearward surface of the control tower and the inner surface of the panel such that the panel may be adapted to be removably couplable to the control tower via the one or more magnets.

In another embodiment, a stand-on utility vehicle is provided that includes a frame carrying a prime mover and ground engaging members operatively attached to the frame. At least one of the ground engaging members may be powered by the prime mover to propel the frame over a ground surface. The vehicle may also include a control tower, a panel, and one or more magnets. The control tower may be located at or near a rear end of the frame. The control tower may carry controls adapted to be manipulated by an operator standing on a platform mounted near the rear end of the frame. The control tower may include one or more rods extending in a direction transverse to the vehicle. The panel may be movably coupled to the control tower. The panel may define an outer surface, and an inner surface adapted to face a rearward surface of the control tower when the panel is coupled to the control tower. The panel may include one or more hooks adapted to at least partially surround the one or more rods such that the panel pivots relative to the control tower about the one or more rods. The one or more magnets may be positioned between the rearward surface of the control tower and the inner surface of the panel such that the panel may be adapted to be removably couplable to the control tower via the one or more magnets.

In yet another embodiment, a utility vehicle is provided that includes a frame carrying a prime mover and ground engaging members operatively attached to the frame. At least one of the ground engaging members may be powered by the prime mover to propel the frame over a ground surface. The vehicle may also include a control tower, a panel, and one or more magnets. The control tower may be located at or near a rear end of the frame. The control tower may carry controls adapted to be manipulated by an operator standing on a platform mounted near the rear end of the frame. The control tower may include one or more tabs or one or more slots. The panel may be movably coupled to the control tower. The panel may define an outer surface, and an inner surface adapted to face a rearward surface of the control tower when the panel is coupled to the control tower. The panel may include the other of the one or more tabs or the one or more slots. The one or more tabs may be adapted to engage the one or more slots to movably couple the panel and the control tower. The one or more magnets may be positioned between the rearward surface of the control tower and the inner surface of the panel such that the panel is adapted to be removably couplable to the control tower via the one or more magnets.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
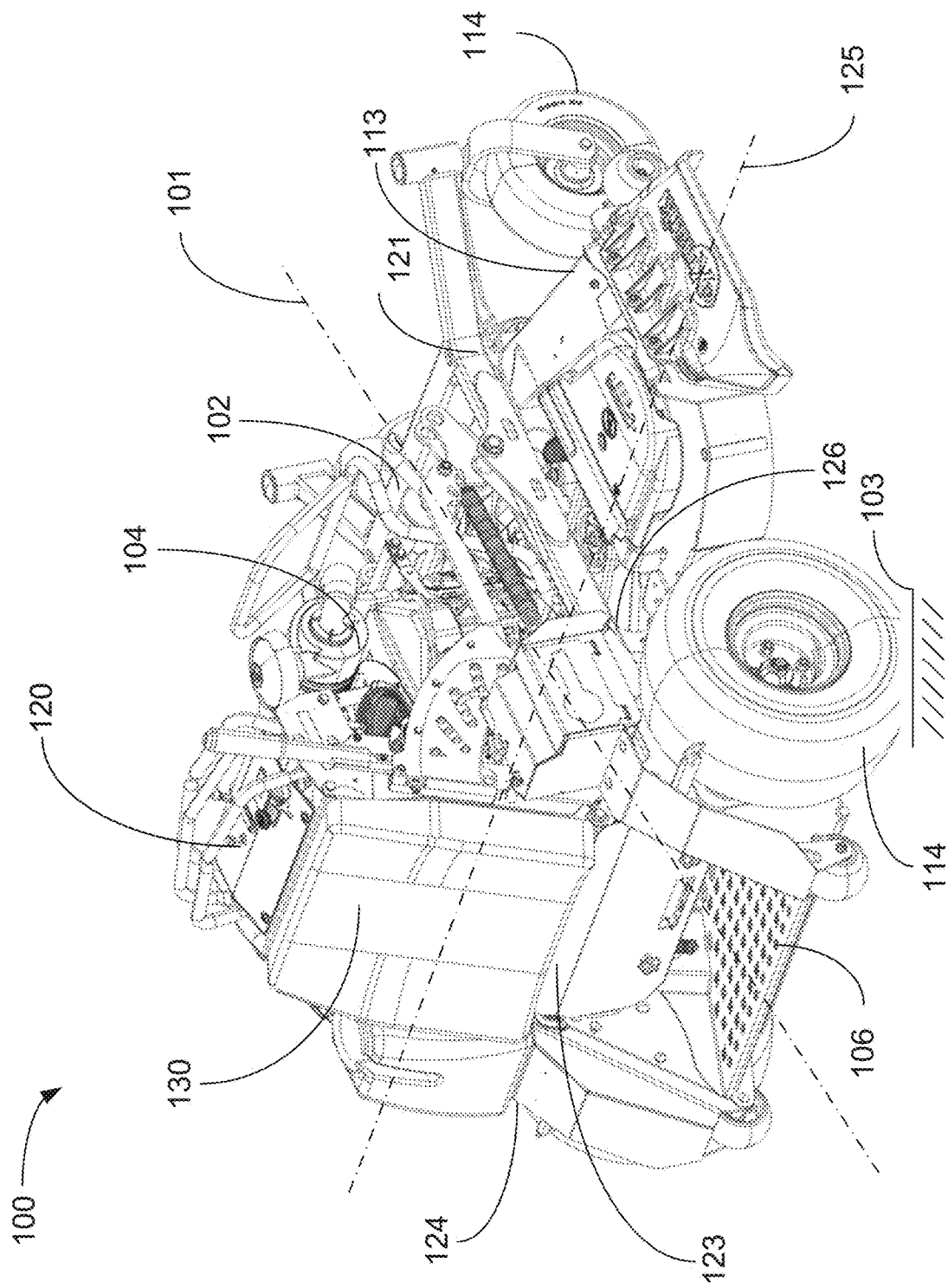
FIG. 1 is a rear perspective view of a utility vehicle in accordance with one embodiment of this disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Furthermore, the terms "comprises" and variations thereof do not have a limiting meaning where these terms appear in this description and claims, and the terms "a," "an," "the," "at least one," and "one or more" are used interchangeably herein.

Figure 5:
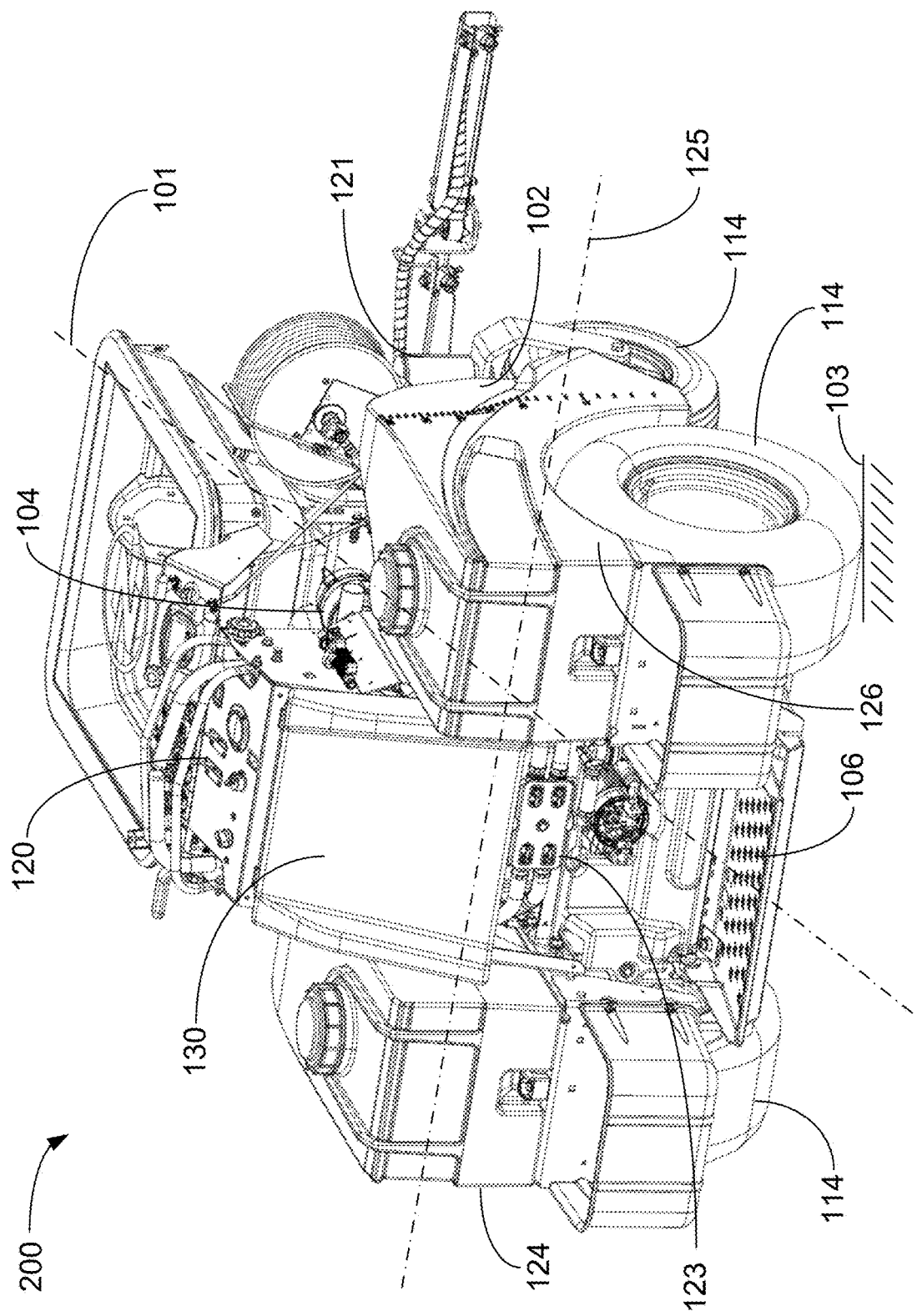
FIG. 5 is a rear perspective view of a utility vehicle in accordance with another embodiment of this disclosure.

Still further, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the vehicle 100, 200 while the vehicle is in an operating configuration, e.g., while it is positioned such that wheels rest upon a generally horizontal ground surface 103 as shown in FIGS. 1 and 5. These terms are used only to simplify the description, however, and not to limit the interpretation of any embodiment described.

Embodiments described and illustrated herein are directed to a utility vehicle having a magnetic access panel operatively attached to the frame in such a way that the panel is both movably coupled and removably coupled to the frame. Specifically, one or more embodiments described and illustrated herein are directed to a stand-on utility vehicle having magnetic access panel attached to the pad or cushion upon which the operator may contact. The utility vehicles described herein may include a variety of different types of vehicles that are adapted to support an operator. For example, the utility vehicles described herein may include compact utility loaders, material haulers, spreader sprayers, mowers, etc. Further, the utility vehicles may support and operate various attachments or working tools.

Additionally, the stand-on utility vehicles described herein may include a platform upon which the operator stands when manipulating controls located on a control console of the control tower (e.g., the platform may be located rearward of the control tower). The control tower may include a leg pad positioned on a rearward side of the control tower such that an operator standing on the platform may lean against. The leg pad may be fixedly coupled to a panel that is adapted to move relative to the control tower. Further, the leg pad and/or panel may cover an access opening to the control tower (e.g., to access components within the control tower) and the leg pad and/or panel may move such that the access opening may be accessible to the operator.

Specifically, the leg pad and/or panel may move (e.g., pivot) relative to the frame (e.g., the control tower) and may be removably couplable to the frame via one or more magnets. In other words, the one or more magnets may secure the leg pad and/or panel to the control tower, but when the operator applies a force to the leg pad and/or panel that overcomes the break force of the magnet, the leg pad and/or panel may be moved (e.g., pivoted) away from the control tower (e.g., while still attached to a hinge or pivot point). Using one or more magnets to removably couple the leg pad and/or panel to the control tower may have various benefits. For example, the one or more magnets do not require additional tools or moving parts to couple the leg pad and/or panel to the control tower (e.g., simplifying the connection). Also, for example, the one or more magnets may be customized to have a desired break force that balances securing the leg pad and/or panel with usability. Further, for example, the one or more magnets may have less maintenance for ensuring a solid connection and may last longer (e.g., as compared to hook and loop fasteners that wear over time).

With reference to the figures of the drawing, wherein like reference numerals designate like parts and assemblies throughout the several views, FIG. 1 illustrates a utility vehicle 100 in accordance with one embodiment of the present disclosure and FIG. 5 illustrates a utility vehicle 200 in accordance with another embodiment of the present disclosure. For example, the utility vehicle 100 illustrated in FIG. 1 is a lawn mower (having a cutting deck 113 attached to a frame 102 of the mower) and the utility vehicle 200 illustrated in FIG. 5 is a sprayer spreader. Both utility vehicles 100, 200 may include a leg pad 130 that is movably coupled to the utility vehicle 100, 200 using one or more magnets. While two specific types of utility vehicles are illustrated herein, various types of utility vehicles are contemplated herein including, e.g., compact utility loaders, material haulers, spreader sprayers, mowers, or vehicles including a tool attachment (such as, e.g., a bucket, forks, a vibratory plow, a grapple rake, a trencher, a leveler, a box rake, a soil cultivator, a snowthrower, a stump grinder, a tiller, an auger, a plow blade, a backhoe, a cement bowl, a leveler, and a material or debris hauler, among others).

Each of the utility vehicles 100, 200 may include a suitably shaped chassis or frame 102 on which a prime mover 104, such as one or more electric motors or internal combustion engines, is carried. The frame may include a front end 121 and a rear end 123 spaced apart along a longitudinal axis 101 of the vehicles 100, 200. Further, the frame 102 may further include left and right sides 124, 126 spaced apart along a transverse axis 125. The frame 102 may support any of the various tools described herein. Additionally, the utility vehicle 100, 200 may include a platform 106 to accommodate a standing operator.

Each of the vehicles 100, 200 may further include a traction system that includes ground engaging members 114 operatively attached to the frame 102 and carrying the frame 102 above the ground surface 103. For example, the ground engaging members 114 may include pneumatic tire-and-wheel combinations, tracks, tireless wheels, "airless" tires such as those sold under "Tweel" (sold by Michelin of Clermont-Ferrand, France) and "Tractus" (sold by Exmark Manufacturing Co., Inc. of Beatrice, Nebraska, USA, etc.

At least one of the ground engaging members 114 may be powered by the prime mover 104 to propel the frame 102 over the ground surface 103. For example, the powered ground engaging members may act as drive members that may be coupled for powered rotation relative to the frame 102 to propel the frame 102 relative to the ground surface 103. Any number of the ground engaging members may be drive members.

As shown in FIGS. 1 and 5, the utility vehicles may also include a control tower 120 that, in the illustrated embodiment, is located at or near the rear end 123 of the vehicle 100 (e.g., at or near the rear end of the frame 102). The control tower 120 may include various controls (e.g., on a control console), e.g., levers, switches, buttons, joysticks, etc., that control vehicle operation. For example, the control tower 120 may include controls that cause various tools or components to actuate. In addition, the control tower 120 may include a movable drive control handle to allow operator control of the traction system that drives the ground engaging members 114. The controls on the control tower 120 may be adapted to be manipulated by an operator standing on a platform 106 mounted near the rear end of the frame 102. During operation, the operator may stand upon the platform 106 and the controls of the control tower 120 may be positioned at a convenient height so that it remains accessible to the operator from this standing position. The controls may include dual levers or a joystick to control the forward and reverse movement of the vehicle, as well as turning (e.g., by actuating the dual levers to differing degrees or twisting the joystick).

Figure 2:
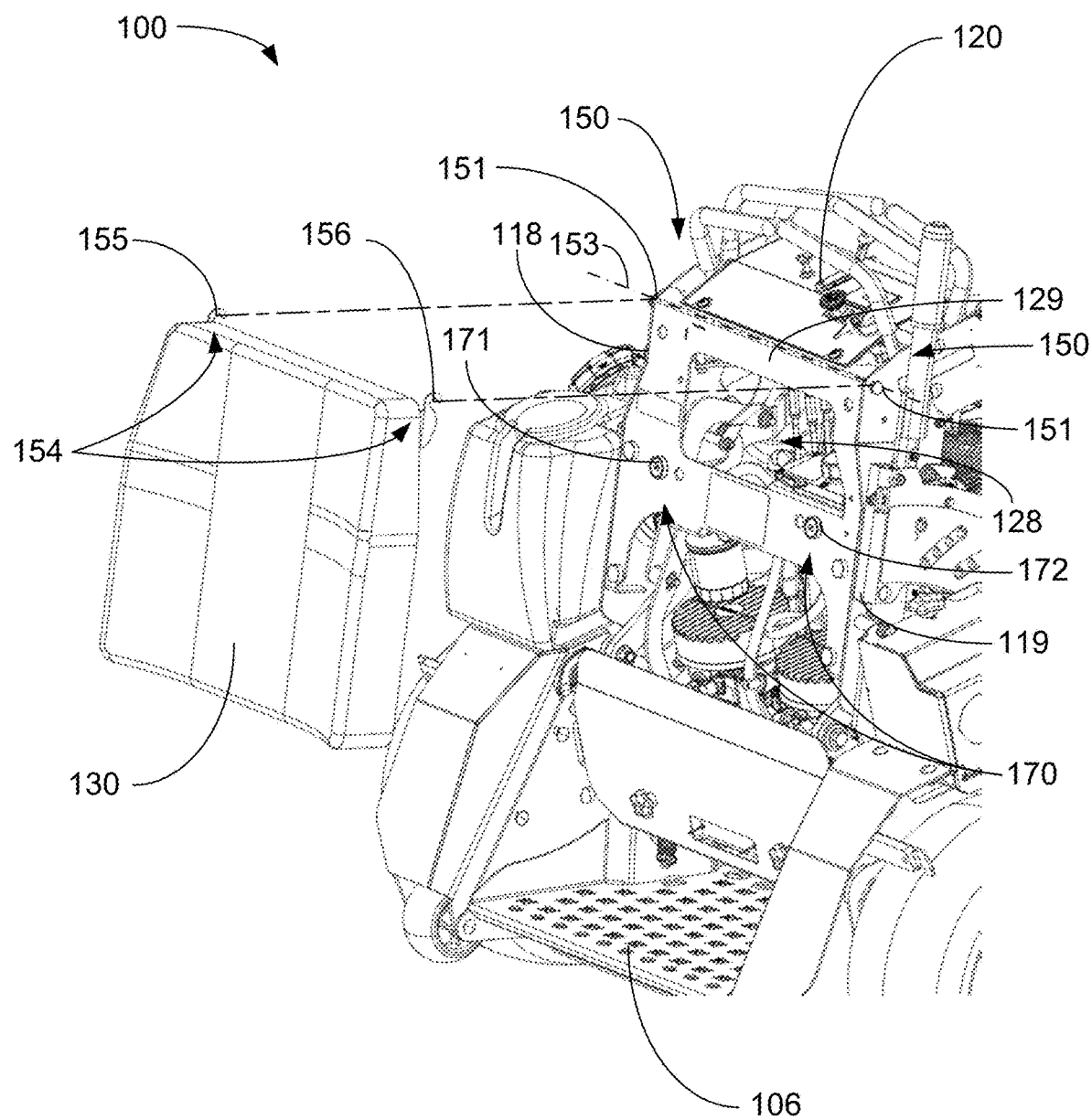
FIG. 2 is an exploded perspective view of the utility vehicle of FIG. 1 with a panel and leg pad shown spaced apart from the remainder of the utility vehicle.
Figure 6:
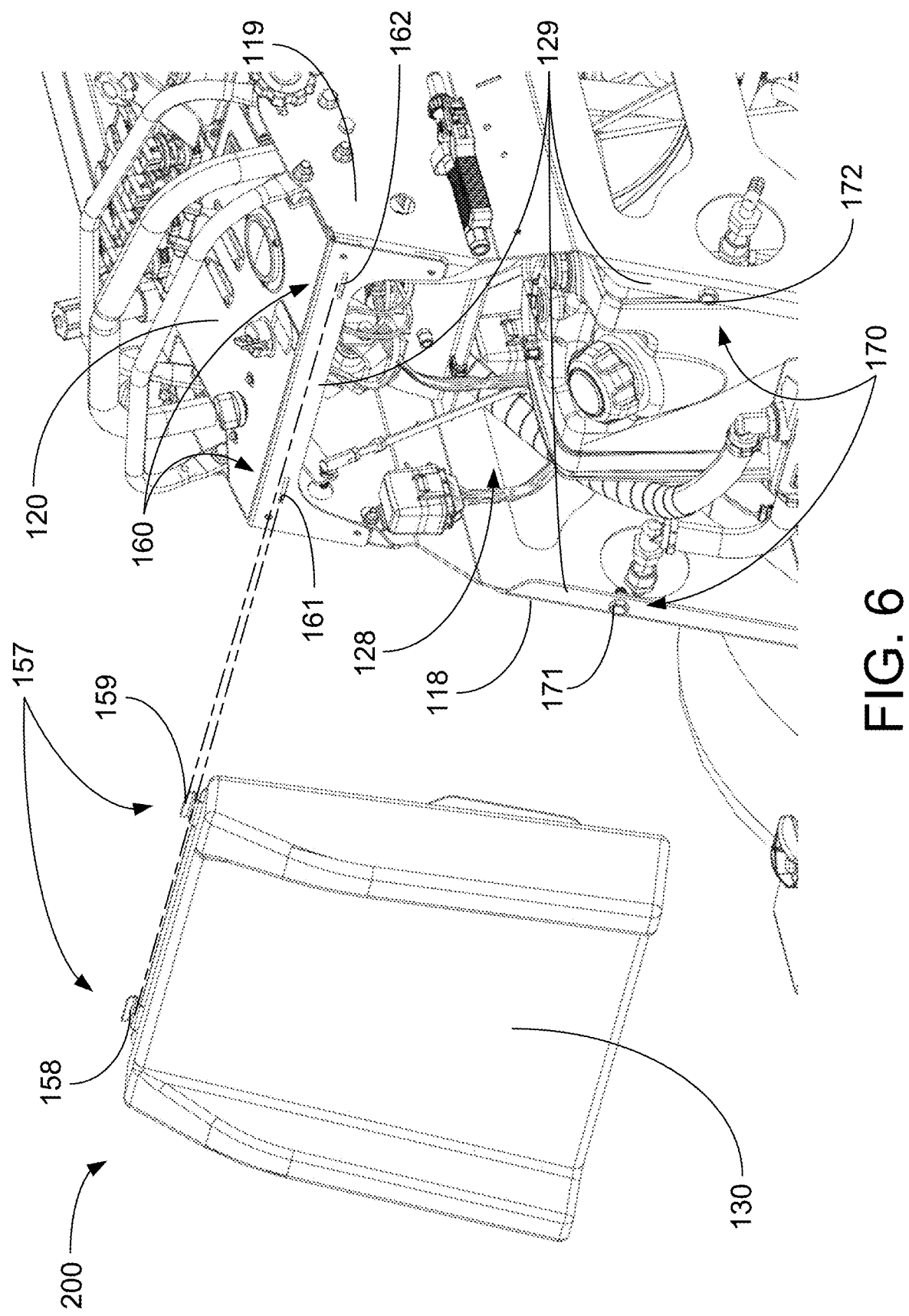
FIG. 6 is an exploded perspective view of the utility vehicle of FIG. 5 with a panel and leg pad shown spaced apart from the remainder of the utility vehicle.

As shown in FIGS. 2 and 6, the control tower 120 may define an access opening 128 through a rearward surface 129 of the control tower 120. In other embodiments, a portion of the frame 102 may define the access opening. The access opening 128 may provide access to components of the vehicle 100, 200 that are located on or within the frame 102 or the control tower 120 (e.g., an interior space) such as, e.g., a fuel tank, operation instructions, fuse block, hydraulic components, tracking adjustment, etc.

Further, the leg pad 130 and/or the panel 140 (located on the other side of the panel in FIGS. 2 and 6) may cover the access opening 128. Specifically, the leg pad 130 may be coupled to panel 140 and the panel 140 may be movably coupled to the frame 102 (e.g., proximate the rearward surface 129 of the control tower 120). As such, the panel 140 may be adapted to contact the rearward surface 129 of the control tower 120, and the leg pad 130 may be coupled to the panel 140 and positioned for interaction with the legs of the operator. In other words, the leg pad 130 may be adapted to contact a leg of the operator standing on the platform 106. In one or more embodiments, the panel 140 may be integrated with the leg pad 130 (e.g., constructed as a single piece).

Further, in one or more embodiments, the panel 140 may be both movably and removably coupled to the frame 102 (e.g., the control tower 120) in such a way that the panel 140 is adapted to move (e.g., pivot, translate, etc.) relative to the frame and be easily removed therefrom (e.g., removed without the use of tools). For example, the panel 140 may be operatively coupled to the frame 102 such that the panel 140 may move relative to the frame 102 when engaged and may be removed from the frame 102 when disengaged. Specifically, a first end region (e.g., a top region) of the panel 140 may be operatively coupled to the frame 102 such that the panel may be both movably (e.g., pivotally, translationally, etc.) and removably coupled or attached to the frame 102. In other words, the first end region of the panel 140 may move (e.g., pivot, translate, etc.) and maintain relatively close proximity to the frame 102 (e.g., the control tower 120), when the panel is engaged with the frame 102, while a second end region of the panel 140 moves away (e.g., lifts up) from the frame 102. Once the panel 140 is spaced away from the frame 102, the operator may more easily access the access opening 128. In one or more embodiments, the panel 140 may be engaged with the frame (e.g., to be movably and removably coupled thereto) via, e.g., pin and receptacle, slot and tab, hooks and rods, French cleat, breakaway hinge, etc. It is noted that, while the embodiments illustrated herein include the panel 140 engaged or operatively coupled proximate a top edge of the panel 140, other sides of the panel 140 (e.g., the right side, the left side, the bottom side) may be operatively coupled to the frame 102 such that the panel 140 moves (e.g., pivots) relative to that side.

The second end region of the panel 140 may be removably secured or coupled to the frame 102 (e.g., the rearward surface 129 of the control tower 120) using one or more magnets 170. For example, the one or more magnets 170 may be positioned between the rearward surface 129 of the control tower 120 and an inner surface 144 (as descried further herein) of the panel 140. Therefore, the panel 140 may be secured to the control tower 120 due to magnetic attraction and force applied by the one or more magnets 170 on one or both of the panel 140 and the control tower 120 (e.g., the one or more magnets 170 may be coupled to one of the panel 140 or the control tower 120 by fastener). As such, the panel 140 and/or the control tower 120 may include (e.g., be formed of) a ferromagnetic material that may be attracted to magnets. It is noted that, in one or more embodiments, the rearward surface 129 may a continuous or non-continuous surface (e.g., various different surfaces that face rearward and are collectively adapted to contact the panel 140).

The one or more magnets 170 may be fixedly coupled to one of the panel 140 or the control tower 120 (e.g., via fastener) such that the one or more magnets 170 may be removably couplable (e.g., by magnetic attraction) to the other of the panel 140 and the control tower 120. In some other utility vehicles using hook and loop fasteners or adhesive (instead of magnets), the adhesive may become dirty and reduce the effectiveness of adhering to the panel or the control tower and may reduce the effectiveness of the hook and loop fastener or adhesive to removably secure the panel to the control tower. By using a fastener to couple the magnets to the panel or control tower (e.g., as described herein), the surrounding conditions may not affect the connection of the magnet to the panel or the control tower and the magnetic attraction.

As shown in FIGS. 2 and 6, the one or more magnets 170 may be fixedly coupled to the control tower 120 and removably couplable to the panel 140. In other words, the one or more magnets 170 may be located on the control tower 120 and the panel 140 may move relative to the control tower 120 and couple to control tower 120 when the panel 140 is in contact with the one or more magnets 170. In other embodiments, the one or more magnets 170 may be fixedly coupled to the panel 140 and removably couplable to the control tower 120. In other words, the one or more magnets 170 may move with the panel 140 and couple the panel 140 to the control tower 120 when the one or more magnets 170 contact the control tower 120.

As such, the panel 140 may be adapted to move or pivot relative to the control tower 120 when the one or more magnets 170 are not attached (e.g., magnetically attached) to one of the panel 140 and the control tower 120 (e.g., allowing the panel 140 to move or pivot freely relative to the control tower 120). Further, the panel 140 may be restricted from moving relative to the control tower 120 when the one or more magnets 170 are attached (e.g., magnetically attached) to the panel 140 and the control tower 120.

The one or more magnets 170 may be positioned in any suitable location relative to the panel 140 and/or the control tower 120. For example, the one or more magnets 170 may be located to magnetically attach near a bottom of the panel 140 (e.g., opposite the pivoting at the top of the panel 140). In other words, the panel 140 may be pivotably coupled to the control tower 120 proximate a top of the panel 140 such that the bottom of the panel 140 is adapted to extend away from the control tower 120 and the one or more magnets 170 removably couple the bottom of the panel 140 to the control tower 120.

The one or more magnets 170 may include any suitable number of magnets. For example, the one or more magnets 170 may include one, two, three, four, five, six, etc. magnets. As shown in FIGS. 2 and 6, the one or more magnets 170 includes two magnets. For example, the one or more magnets 170 may include a first magnet 171 fixedly coupled to a left side 118 of the rearward surface 129 of the control tower 120 and a second magnet 172 fixedly coupled to a right side 119 of the rearward surface 129 of the control tower 120.

Further, by using one or more magnets 170, the force at which the panel 140 is coupled to the control tower 120 may be controlled. For example, the coupling or break force of the one or more magnets 170 may be specifically set to a value that optimizes the force that couples the panel 140 to the control tower 120 and the force to remove the panel 140 from the control tower 120. Specifically, the one or more magnets may define a break force or magnetic pull of about 10 lbs. to 90 lbs. Further, the one or more magnets 170 may assist in maintaining the connection between the panel 140 and the control tower 120 (e.g., during bouncing or jostling of the panel 140 during operation of the vehicle 100, 200). Additionally, the one or more magnets 170 may last over multiple uses of attaching and detaching as compared to coupling using a hook and loop fastener (e.g., due to wearing out of the loops over time).

The panel 140 may be removably attached to the control tower 120 in a variety of different ways. For example, the utility vehicle 100 (and components thereof) shown in FIGS. 1-4 illustrate a first embodiment in accordance with the present disclosure and the utility vehicle 200 (and components thereof) shown in FIGS. 5-8 illustrate a second embodiment in accordance with the present disclosure. In other words, the utility vehicles 100, 200 illustrated in the two different embodiments include different ways for the panel 140 to pivot relative to the control tower 120. It is noted that the features described herein in connection to the two embodiments may be used in any suitable combinations.

Figure 3:
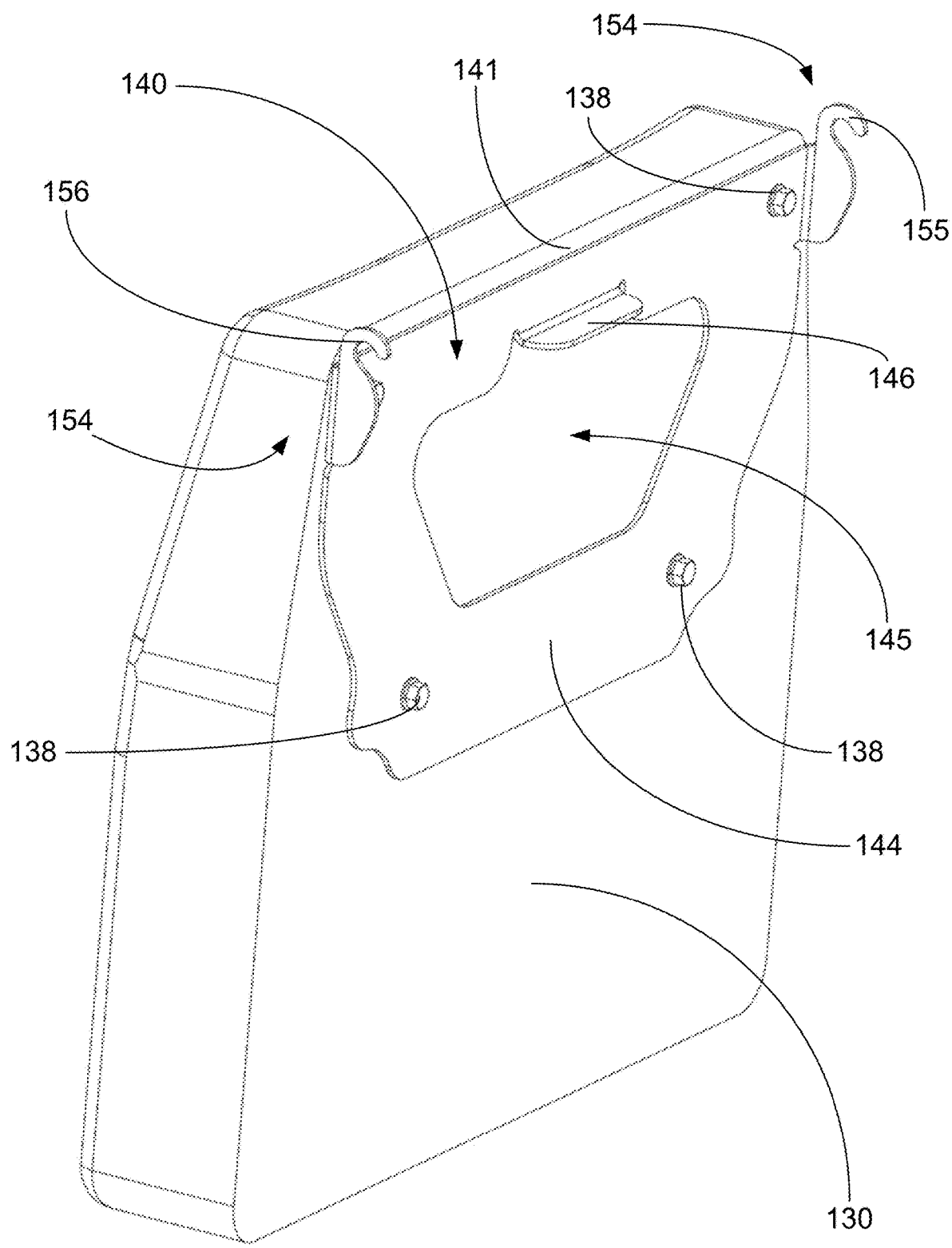
FIG. 3 is an isolated perspective view of a panel and leg pad of the utility vehicle of FIG. 1.
Figure 4:
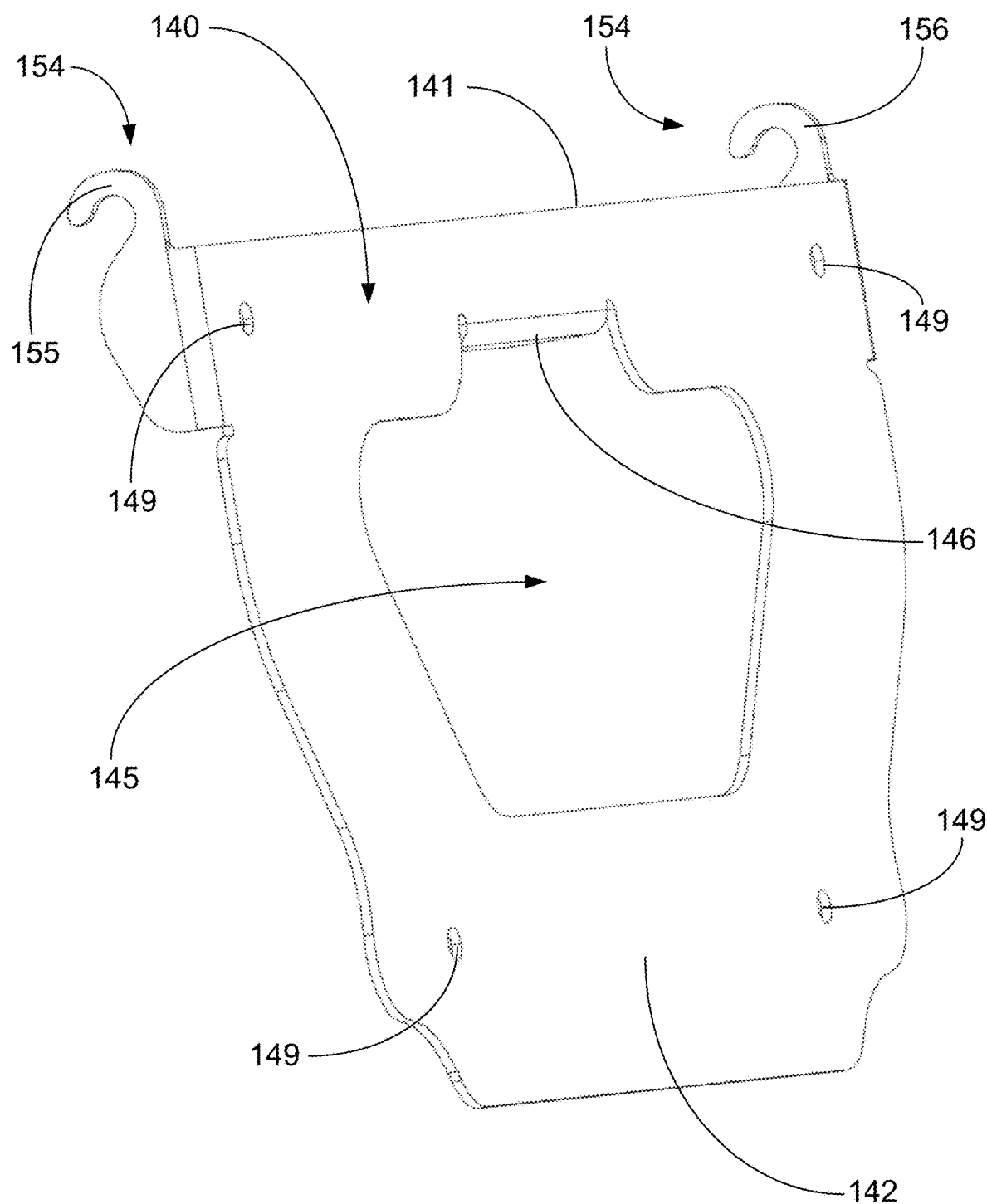
FIG. 4 is an isolated perspective view of a panel of the utility vehicle of FIG. 1.

For example, the utility vehicle 100 (as shown in FIGS. 1-4) may include a panel 140 that includes rods extending from the control tower 120 and hooks extending from the panel 140 that interact with the rods. The panel 140 may be movably coupled to the control tower 120 due to the interaction between the rods and hooks. The panel 140 may define an outer surface 142 (e.g., as shown in FIG. 4) and an inner surface 144 (e.g., as shown in FIG. 3). The inner surface 144 of the panel 140 may be adapted to face the rearward surface 129 of the control tower 120 when the panel 140 is coupled to the control tower 120. Further, the inner surface 144 may be attracted by the one or more magnets 170 to secure the panel 140 to the control tower 120. When the panel 140 is attached to the control tower 120, the panel 140 may be spaced apart from the control tower 120 by about 0.25 inches to about 0.5 inches. In other words, the one or more magnets 170 may protrude from the rearward surface 129 of the control tower 120 by about 0.25 inches to about 0.5 inches.

Additionally, as shown in FIG. 3, the outer surface 142 of the panel 140 may be coupled to the leg pad 130 such that the leg pad 130 moves along with the panel 140. In one or more embodiments, the panel 140 may be attached to the leg pad 130 via one or more fasteners 138 (e.g., bolts) extending through fastener openings 149 (e.g., as shown in FIG. 4) defined in the panel 140. In one or more embodiments (e.g., as shown in the embodiment illustrated in FIGS. 7-8), the fastener openings 149 may be defined by elongated slots 148 such that the vertical position of the leg pad 130 may be adjusted relative to the panel 140. As such, the height of the leg pad 130 relative to the control tower 120 may be adjusted up or down by the operator.

The panel 140 may define any suitable thickness (e.g., measured between the inner and outer surfaces 144, 142). For example, the panel 140 may define a thickness of about 0.060 inches to about 0.105 inches. The thickness of the panel 140 may be such that it is robust enough to carry the weight of the leg pad 130 and pivot relative to the control tower 120, but not so heavy as to burden the pivoting apparatus. Further, in one or more embodiments, the panel 140 may define a cutout 145 or opening within the outer bounds of the panel 140 to, e.g., further reduce the weight of the panel 140. Specifically, the cutout 145 may define an area that is greater than or equal to 30% of a total area of the panel 140. Furthermore, the panel 140 may include (e.g., be formed of) any suitable materials such as, for example, aluminum, plastic, wood, composite, stainless steel, etc. In one or more embodiments, the panel 140 may be integrated with the leg pad 130 (e.g., constructed as a single piece).

As previously noted, the panel 140 illustrated in FIGS. 1-4 may move (e.g., pivot) relative to the control tower 120 via rods and hooks. For example, the control tower 120 may include one or more rods 150 extending in a direction transverse 125 to the vehicle 100 and the panel 140 may include one or more hooks 154 adapted to at least partially surround the one or more rods 150 such that the panel 140 may pivot relative to the control tower 120 about the one or more rods 150 (e.g., as shown in FIG. 1). In other words, the one or more rods 150 define cylindrical members that extend outwardly from the control tower 120 (e.g., on either side of the control tower 120) and the one or more hooks 154 hang from the one or more rods 150. The one or more hooks 154 may define a hook opening upon which the one or more hooks 154 may be placed on the one or more rods 150. For example, the one or more hooks 154 may be placed on or removed from the one or more rods 150 by moving the one or more hooks 154 in a direction defined by the hook opening. Further, the one or more hooks 154 may conform to the surface of the one or more rods 150 such that the one or more hooks 154 may pivot about a pivot axis 153 defined at the center of the one or more rods 150. In other embodiments, the control tower 120 may include the one or more hooks and the panel 140 may include the one or more rods.

As shown in FIGS. 3-4, the one or more hooks 154 may be located proximate a top edge 141 of the panel 140. Further, the one or more hooks 154 may be adapted to pivot about a pivot axis 153 (e.g., defined by the center of the one or more rods 150) that extends beyond the top edge 141 of the panel 140. In other words, the panel 140 pivots relative to the control tower 120 (e.g., the one or more rods 150) such that the top of the panel 140 remains near the control tower 120. Also, by extending the pivot axis 153 to a location above the top edge 141, the body of the panel 140 may not interfere with the control tower 120 when pivoting.

In one or more embodiments, the panel 140 may also include a retention tab 146 extending from the inner surface 144 of the panel 140 (e.g., as shown in FIG. 3). The retention tab 146 may be adapted to contact the control tower 120 (e.g., a surface defining the access opening 128) when the panel 140 is in contact with the control tower 120 (e.g., in a closed position). The retention tab 146 may be adapted to contact a surface of the control tower 120 such that movement of the panel 140 is restricted from moving relative to the control tower 120 in at least one direction (e.g., the direction to remove the hooks 154 from the rods 150 through the hook opening when the panel 140 is closed).

For example, the panel 140 may be restricted from being removed from the one or more rods 150 while the panel 140 is closed against the control tower 120. Specifically, the retention tab 146 may restrict upward movement of the panel 140 relative to the control tower 120 when the retention tab 146 is in contact with the control tower 120. As such, the panel 140 cannot be removed from the control tower 120 when closed against the control tower 120. The retention tab 146 may assist in preventing the leg pad 130 and panel 140 from becoming detached during operation of the vehicle 100, e.g., because jostling and pressure from the operator's legs cannot unintentionally move the panel 140 (e.g., due to the restriction provided by the retention tab 146). Further, the panel 140 may be pivoted such that the retention tab 146 no longer contacts a surface of the control tower 120 (e.g., pivoting towards an open position) and then the panel 140 may be removed from the one or more rods 150.

The one or more hooks 154 may be positioned on either side of the panel 140 (e.g., as shown in FIGS. 3-4). Further, the one or more hooks 154 may be defined by a surface that is perpendicular to the body of the panel 140. Also, the one or more hooks 154 may extend above the top edge 141 of the panel 140. Additionally, the one or more hooks 154 may include any suitable number of hooks and the one or more rods 150 may include any suitable number of corresponding rods. As shown in FIGS. 1-2, the one or more rods 150 may include a first rod 151 extending in a leftward direction from the control tower 120 and a second rod 152 extending in a rightward direction form the control tower 120. Correspondingly, the one or more hooks 154 may include a first hook 155 and a second hook 156 adapted to at least partially surround the first and second rods 151, 152, respectively.

Figure 7:
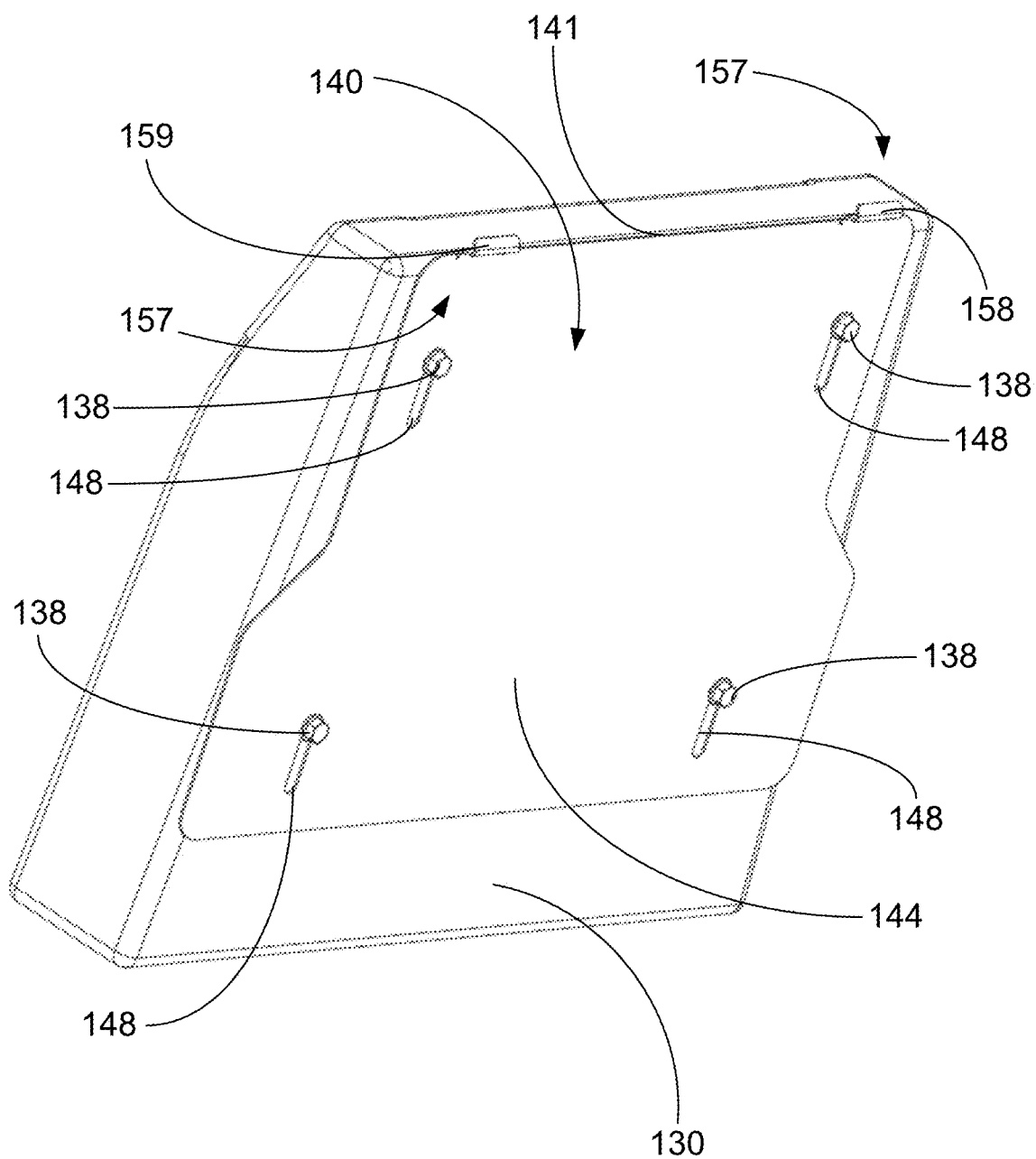
FIG. 7 is an isolated perspective view of a panel and leg pad of the utility vehicle of FIG. 5.
Figure 8:
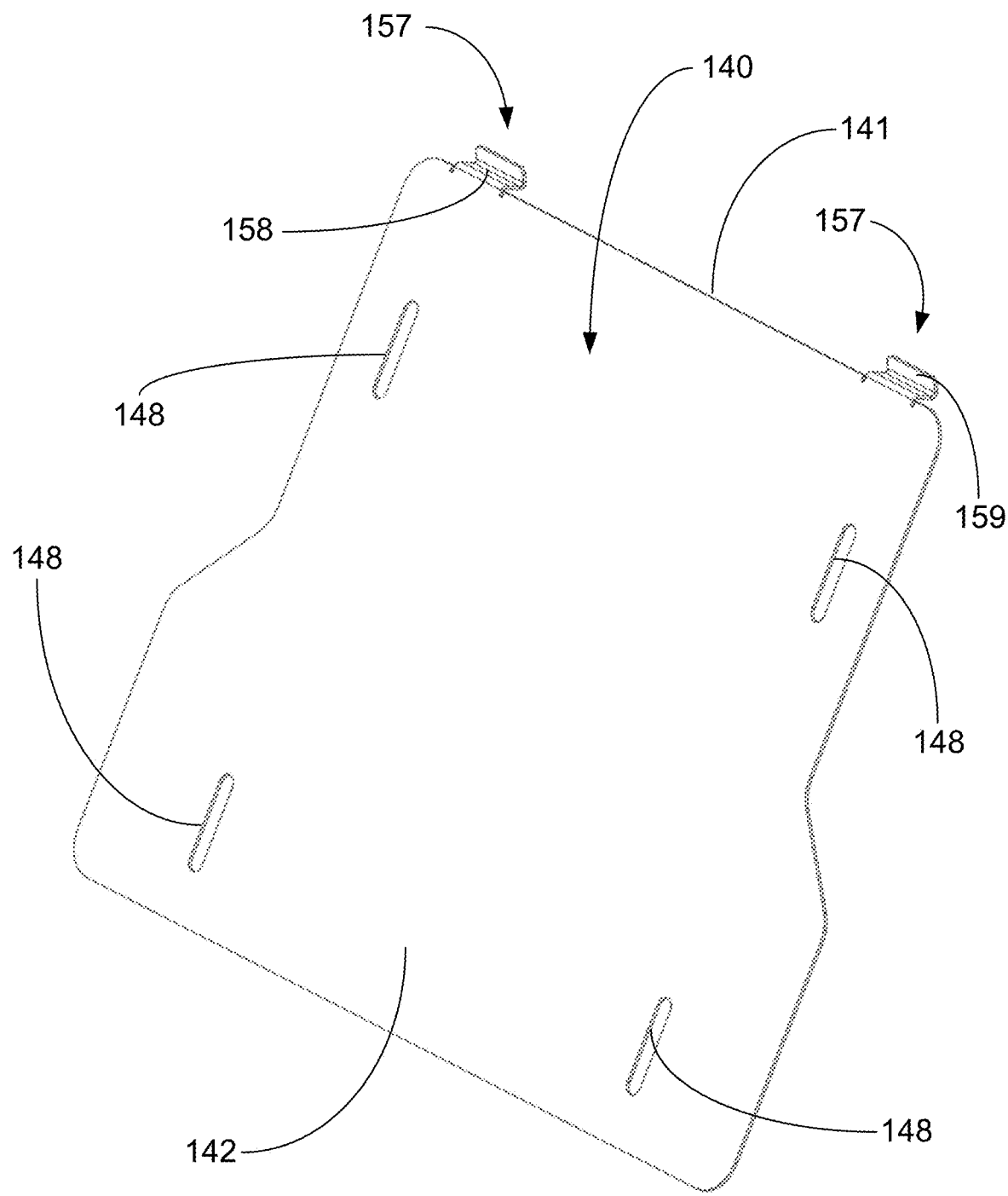
FIG. 8 is an isolated perspective view of a panel of the utility vehicle of FIG. 5.

Also, for example, the utility vehicle 200 (as shown in FIGS. 5-8) may include a panel 140 that includes slots defined by the control tower 120 and tabs extending from the panel 140 that interact with the slots. The panel 140 may be movably coupled to the control tower 120 due to the interaction between the slots and tabs. The panel 140 may define an outer surface 142 (e.g., as shown in FIG. 8) and an inner surface 144 (e.g., as shown in FIG. 7). The inner surface 144 of the panel 140 may be adapted to face the rearward surface 129 of the control tower 120 when the panel 140 is coupled to the control tower 120 (e.g., in a closed position). Further, the inner surface 144 may be attracted by the one or more magnets 170 to secure the panel 140 to the control tower 120. When the panel 140 is attached to the control tower 120, the panel 140 may be spaced apart from the control tower by about 0.25 inches to about 0.5 inches. In other words, the one or more magnets 170 may protrude from the rearward surface 129 of the control tower 120 by about 0.25 inches to about 0.5 inches.

Additionally, as shown in FIG. 7, the outer surface 142 of the panel 140 may be coupled to the leg pad 130 such that the leg pad 130 moves along with the panel 140. In one or more embodiments, the panel 140 may be attached to the leg pad 130 via one or more fasteners 138 (e.g., bolts) extending through fastener openings or elongated slots 148 defined in the panel 140. The elongated slots 148 may allow the vertical position of the leg pad 130 may be adjusted relative to the panel 140. As such, the height of the leg pad 130 relative to the control tower 120 may be adjusted up or down by the operator.

The panel 140 may define any suitable thickness (e.g., measured between the inner and outer surfaces 144, 142). For example, the panel 140 may define a thickness of about 0.060 inches to about 0.105 inches. The thickness of the panel 140 may be such that it is robust enough to carry the weight of the leg pad 130 and pivot relative to the control tower 120, but not so heavy as to burden the pivoting apparatus. Furthermore, the panel 140 may include (e.g., be formed of) any suitable materials such as, for example, aluminum, plastic, composite, wood, stainless steel, etc. In one or more embodiments, the panel 140 may be integrated with the leg pad 130 (e.g., constructed as a single piece).

As previously noted, the panel 140 illustrated in FIGS. 5-8 may pivot relative to the control tower 120 via tabs and slots. For example, the control tower 120 may include one or more tabs 157 or one or more slots 160 and the panel 140 may include the other of the one or more tabs 157 or the one or more slots 160. The one or more tabs 157 may be adapted to engage the one or more slots 160 to movably couple (e.g., pivotably couple) the panel 140 and the control tower 120. In other words, the one or more tabs 157 and the one or more slots 160 may be on either of the panel 140 and the control tower 120 so long as the tabs 157 and the slots 160 are positioned to engage with one another. For example, as shown in FIG. 6, the control tower 120 may include the one or more slots 160 and the panel 140 may include the one or more tabs 157. In other embodiments, the control tower 120 may include the one or more tabs 157 and the panel 140 may include the one or more slots 160.

The one or more slots 160 may extend in a direction transverse 125 to the vehicle 200 such that the panel 140 may be adapted to pivot about a transverse axis when the one or more tabs 157 are engaged with the one or more slots 160. Further, the one or more tabs 157 may be located proximate a top edge 141 of the panel 140. Further yet, the one or more tabs 157 may extend away from the inner surface 144 of the panel 140 and then upward (e.g., forming a L-shape). The L-shape of the one or more tabs 157 may help to maintain the one or more tabs 157 within the one or more slots 160 because the one or more tabs 157 may be inserted into the one or more slots 160 along one plane and then pivoted downwards towards the control tower 120. In other words, the structure of the one or more tabs 157 may restrict upwards movement of the panel 140 and leg pad 130 when attached to the control tower 120 through the one or more magnets 170 (e.g., in a closed position).

Additionally, the vehicle 200 may include any number of tabs 157 and slots 160. For example, as shown in FIGS. 5-8, the vehicle 200 may include two tabs and two slots. Further, as shown in FIG. 6, the one or more slots 160 may include first and second slots 161, 162 extending along a horizontal axis and spaced apart from one another (e.g., defined in the control tower 120), and the one or more tabs 157 may include first and second tabs 158, 159 adapted to engage the first and second slots 161, 162, respectively. In one or more embodiments, the first and second slots 161, 162 may extend along a vertical axis such that the panel 140 pivots from, e.g., the left or right. Further, as described herein, the panel 140 pivots from a top edge but, in one or more embodiments, the panel 140 may pivot from a bottom edge such that the bottom edge remains proximate the frame and the top edge is moved away from the frame.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A utility vehicle comprising:
a frame carrying a prime mover;
ground engaging members operatively attached to the frame, wherein at least one of the ground engaging members is powered by the prime mover to propel the frame over a ground surface;
a panel extending between a first end region and a second end region, wherein the first end region of the panel is operatively coupled to the frame such that the panel is both movably and removably attached to the frame, wherein the panel defines an outer surface, and an inner surface adapted to face a portion of the frame when the panel is coupled to the frame; and
one or more magnets positioned between the portion of the frame and the inner surface of the panel proximate the second end region of the panel such that the second end region of the panel is adapted to be removably couplable to the frame via the one or more magnets.

2. The utility vehicle of claim 1, further comprising a leg pad coupled to the outer surface of the panel, wherein the leg pad is configured to contact a leg of an operator standing on a platform mounted near a rear end of the frame.

3. The utility vehicle of claim 1, wherein the first end region of the panel is hinged to the frame such that the panel is pivotably attached to the frame.

4. The utility vehicle of claim 1, wherein the first end region of the panel defines a top region, above the second end region, when the panel is in a closed position.

5. The utility vehicle of claim 1, wherein the one or more magnets are fixedly coupled to the frame and removably couplable to the panel.

6. The utility vehicle of claim 1, wherein the panel includes a cutout.

7. The utility vehicle of claim 1, wherein the panel includes elongated slots.

8. The utility vehicle of claim 1, wherein the panel comprises a tab extending in a plane that is different than a plane of the inner surface.

9. The utility vehicle of claim 8, wherein the tab is located proximate one of the first and second end regions.

10. The utility vehicle of claim 1, wherein a top edge of the panel defines a total top width along a linear path that is less than a total bottom width of a bottom edge of the panel along a linear path.

11. The utility vehicle of claim 1, wherein the panel comprises a single continuous piece.

12. The utility vehicle of claim 1, wherein the one or more magnets are positioned proximate the second end region of the panel.

13. A stand-on utility vehicle comprising:
a frame carrying a prime mover;
ground engaging members operatively attached to the frame, wherein at least one of the ground engaging members is powered by the prime mover to propel the frame over a ground surface;
a control tower located at or near a rear end of the frame, the control tower carrying controls adapted to be manipulated by an operator standing on a platform mounted near the rear end of the frame;
a panel movably coupled to the control tower, wherein the panel defines an outer surface, and an inner surface adapted to face a rearward surface of the control tower when the panel is coupled to the control tower;
a leg pad coupled to the outer surface of the panel, wherein the leg pad is adapted to contact a leg of the operator standing on the platform; and
one or more magnets positioned between the rearward surface of the control tower and the inner surface of the panel such that the panel is adapted to be couplable to the control tower via the one or more magnets.

14. The utility vehicle of claim 13, wherein the panel is configured to be couplable to the control tower proximate an end region of the panel.

15. The utility vehicle of claim 13, wherein the panel is configured to be couplable to the control tower proximate a top end region of the panel.

16. The utility vehicle of claim 13, wherein the panel is configured to be couplable to the control tower proximate a bottom end region of the panel.

17. The utility vehicle of claim 13, wherein the panel is configured to be couplable to the control tower proximate a first end region of the panel and hinged to the control tower proximate a second end region of the panel.

18. The utility vehicle of claim 13, wherein the panel is configured to move relative to the control tower when the one or more magnets are not engaged with one of the panel and the control tower, and the panel is restricted from moving relative to the control tower when the one or more magnets are engaged with the panel and the control tower.

19. The utility vehicle of claim 13, wherein the one or more magnets are fixedly coupled to the control tower and couplable to the panel.

20. The utility vehicle of claim 13, wherein the panel defines a cutout.

21. The utility vehicle of claim 13, wherein the panel includes elongated slots.

22. The utility vehicle of claim 13, wherein the panel comprises a tab extending in a plane that is different than a plane of the inner surface.

23. The utility vehicle of claim 22, wherein the tab is located proximate one of a first and second end region of the panel.

24. The utility vehicle of claim 13, wherein a top edge of the panel defines a total top width along a linear path that is less than a total bottom width of a bottom edge of the panel along a linear path.

25. The utility vehicle of claim 13, wherein the one or more magnets comprise a first magnet fixedly coupled to a left side of the rearward surface of the control tower and a second magnet fixedly coupled a right side of the rearward surface of the control tower.

26. A stand-on lawn mower comprising:
a frame carrying a prime mover;
ground engaging members operatively attached to the frame, wherein at least one of the ground engaging members is powered by the prime mover to propel the frame over a ground surface;
a control tower located at or near a rear end of the frame, the control tower carrying controls configured to be manipulated by an operator standing on a platform mounted near the rear end of the frame;
a deck attached to the frame and positioned at least partially forward of the control tower;
a panel movably coupled to the control tower, wherein the panel defines an outer surface, and an inner surface configured to face a rearward surface of the control tower when the panel is in a closed position relative to the control tower;
a leg pad coupled to the outer surface of the panel, wherein the leg pad is configured to contact a leg of the operator standing on the platform; and
one or more magnets positioned between the control tower and the panel such that the panel is configured to be couplable to the control tower via the one or more magnets.

27. The lawn mower of claim 26, wherein the panel is configured to be couplable to the control tower proximate a first end region of the panel and hinged to the control tower proximate a second end region of the panel.

28. The lawn mower of claim 26, wherein the panel is configured to be couplable to the control tower proximate a top end region of the panel.

29. The lawn mower of claim 26, wherein the panel is configured to be couplable to the control tower proximate a bottom region of the panel.

\* \* \* \* \*